United States Patent
Bruder et al.

(10) Patent No.: US 8,436,128 B2
(45) Date of Patent: May 7, 2013

(54) SUBSTRATE MATERIAL FOR HIGH SPEED OPTICAL DISCS

(75) Inventors: Friedrich-Karl Bruder, Krefeld (DE); Wilfried Haese, Odenthal (DE); Rafael Oser, Krefeld (DE); Ulrich Blaschke, Krefeld (DE); Raymond Wong, Hong Kong (CN); Ice Zhang, Shanghai (CN); Jörg Wehrle, Remagen (DE); Michael Roppel, Burscheid (DE)

(73) Assignee: Bayer Intellectual Property GmbH (DE)

( * ) Notice: Subject to any disclaimer, the term of this patent is extended or adjusted under 35 U.S.C. 154(b) by 0 days.

(21) Appl. No.: 13/142,097

(22) PCT Filed: Dec. 12, 2009

(86) PCT No.: PCT/EP2009/008903
§ 371 (c)(1), (2), (4) Date: Aug. 19, 2011

(87) PCT Pub. No.: WO2010/072344
PCT Pub. Date: Jul. 1, 2010

(65) Prior Publication Data
US 2012/0065354 A1 Mar. 15, 2012

(30) Foreign Application Priority Data
Dec. 25, 2008 (WO) ................ PCT/CN2008/002083

(51) Int. Cl.
*C08G 64/00* (2006.01)
*C08G 63/02* (2006.01)

(52) U.S. Cl.
USPC ........................ 528/196; 428/64.4; 528/198

(58) Field of Classification Search .................. 428/64.4; 528/196, 198
See application file for complete search history.

(56) References Cited

U.S. PATENT DOCUMENTS

| | | |
|---|---|---|
| 5,097,002 A | 3/1992 | Sakashita et al. |
| 5,340,905 A | 8/1994 | Kuhling et al. |
| 5,717,057 A | 2/1998 | Sakashita et al. |
| 6,126,992 A | 10/2000 | Khanarian et al. |
| 6,596,840 B1 | 7/2003 | Kratschmer et al. |
| 6,740,730 B1 | 5/2004 | Kratschmer et al. |
| 2004/0158026 A1 | 8/2004 | Kauth et al. |
| 2004/0241375 A1 | 12/2004 | Koya et al. |

FOREIGN PATENT DOCUMENTS

| | | |
|---|---|---|
| EP | 1130587 A2 | 9/2001 |
| EP | 1518880 A1 | 3/2005 |
| JP | 2000195099 A | 7/2000 |
| JP | 2004124027 A | 4/2004 |
| JP | 2006318525 A | 11/2006 |
| KR | 20030073242 A | 9/2003 |
| WO | WO-01/05866 A1 | 1/2001 |
| WO | WO-01/05867 A1 | 1/2001 |
| WO | WO-2004/063249 A1 | 7/2004 |

OTHER PUBLICATIONS

U.S. Appl. No. 13/142,106, filed Jun. 24, 2011, Bruder et al.

*Primary Examiner* — Terressa Boykin
(74) *Attorney, Agent, or Firm* — Novak Druce Connolly Bove + Quigg LLP

(57) ABSTRACT

This invention relates to the use of polycarbonate for the production of an optical recording medium in which secure high speed operation, a transcriptability of the pit/groove structure of >85% and sufficient disc flatness can be achieved and the polycarbonate is based on bisphenol A and the polycarbonate contains a release agent in an amount less than 2000 ppm.

9 Claims, 2 Drawing Sheets

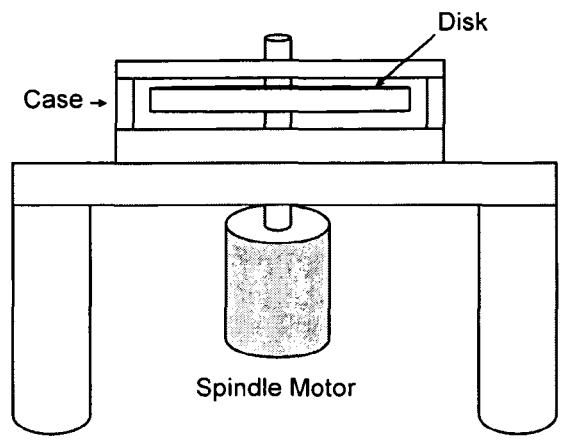
Figure 1: Rotation Table
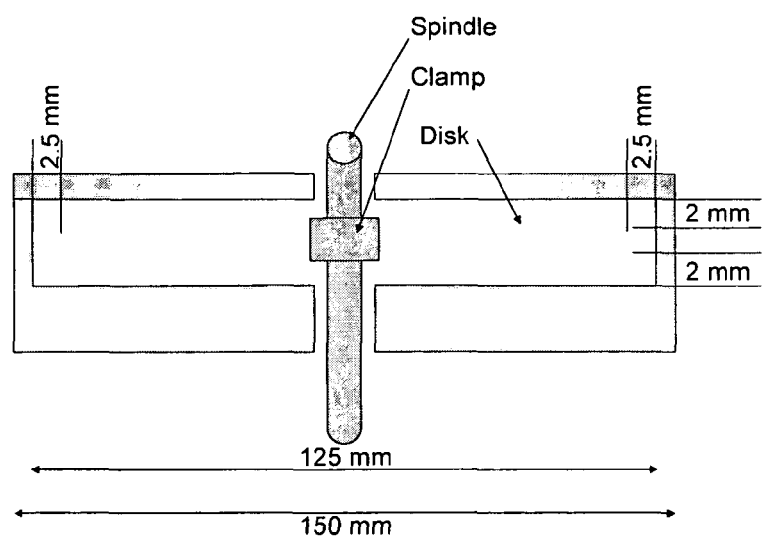
Figure 2: Case

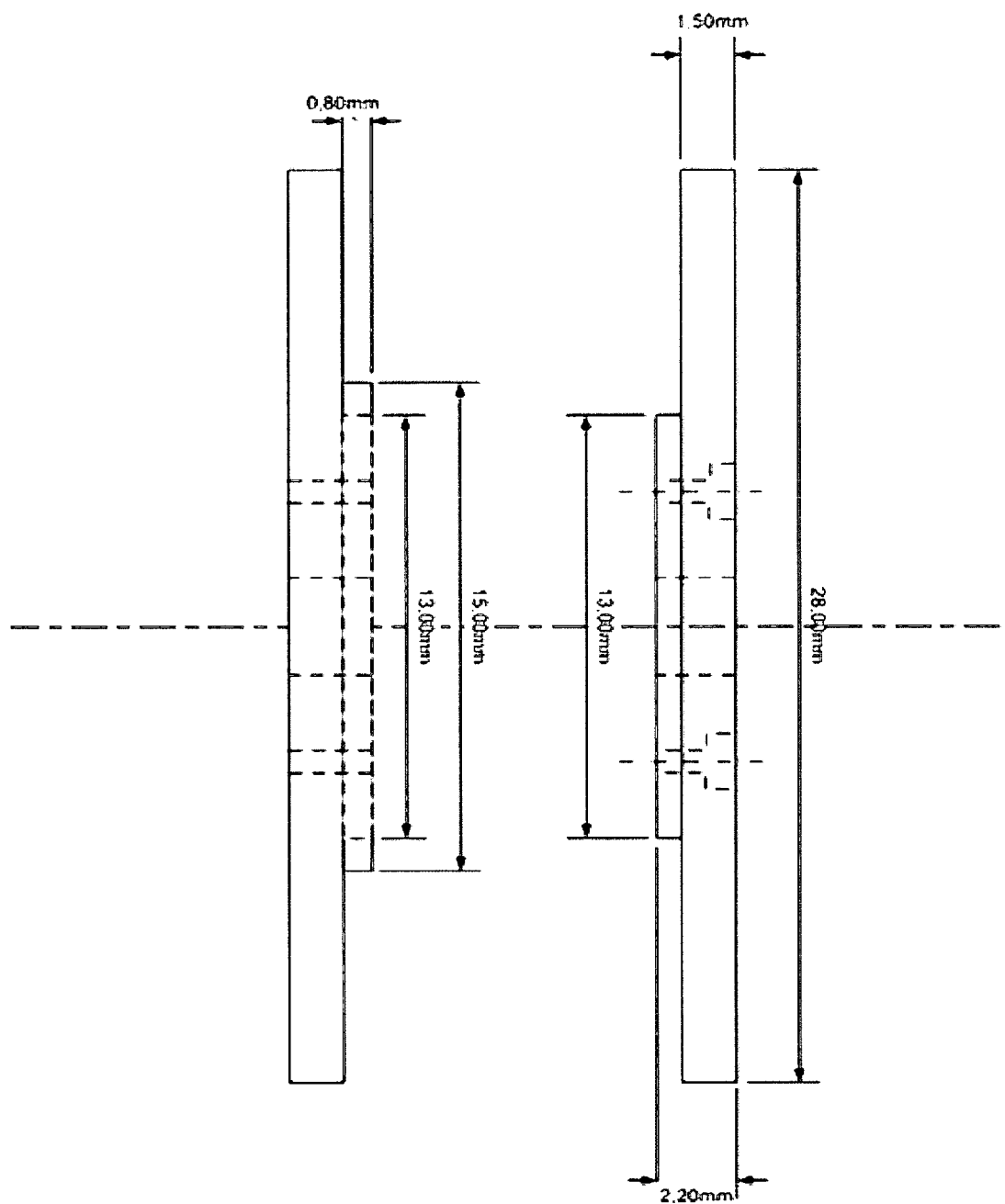
Figure 3: Clamp

SUBSTRATE MATERIAL FOR HIGH SPEED OPTICAL DISCS

This application is a national stage application (under 35 U.S.C. §371) of PCT/EP2009/008903, filed Dec. 12, 2009, which claims benefit of PCT application PCT/CN2008/002083, filed Dec. 25, 2008. PCT/EP2009/008903 published as WO 2010/072344 on Jul. 1, 2010.

FIELD OF INVENTION

The present invention describes the usage of special polycarbonates for the production of optical discs, which can be used safely without breakage in optical disc drives at high spinning speeds and exhibit a good transcriptability.

DESCRIPTION OF RELATED ART

The development of optical data storage is mainly characterized by the increase of the storage capacity per disc from one generation to the next generation. This can be exemplified e.g. by the 0.7 GByte capacity per disc in the Compact Disc (CD) format, the 4.7 GByte capacity of a single layer Digital Versatile Disc (DVD) and the 25 GByte capacity of a single layer Blu-ray Disc (BD). As can be seen in the case of DVD and BD those capacities can be increased by introducing e.g. double layer discs or discs with even more layers or double side accessible discs:

An additional important point is the data transfer rate during readout and/or recording of a disc. Due to the fact that the data are readout and/or recorded sequentially, the increase of the storage density lead to increasing readout and/or recording times of a full disc, despite the fact that the pits or recorded marks become smaller from one generation to the next generation. This lack of transfer rate is compensated for that the reference speed for 1× recording and readout for each format increases from one generation to the next generation. To increase the data transfer rate within a format the increase of the spinning speed of the disc facilitates high speed recording and readout.

For the CD-format drives and discs were developed which can access 52× of data transfer rates in comparison to the 1× reference speed. For 52× speed the spinning speed is about 10500 rounds per minute (RPM) as for a 0.7 GByte capacity disc the linear reference speed is 1.2 m/s.

For the DVD-format drives and discs were developed which can access up to 22× of data transfer rate in comparison to the 1× reference speed. For 22× speed the spinning speed is about 12830 RPM.

For the BD-format discs and drives exist that support up to 8× of data transfer rate in comparison to the 1× reference speed. For 8× speed the spinning speed is about 6480 RPM as the linear velocity for the 1× reference speed is 4.92 m/s for a 25 GByte/layer capacity disc. In the laboratory 12× recording speed was already demonstrated, which corresponds to 9720 RPM spinning speed of the disc (In proceedings of the ISOM 2006 (International Symposium of Optical Memory) held in Takamatsu, Japan, "Up to 12× BD-R (Cu:Si) Recording", R. G. J. A. Hesen, J. H. G. Jaegers, A. P. G. E. Janssen, J. Rijpers, P. R. V. Sonneville, J. J. H. B. Schleipen, Philips Research Laboratories, High Tech Campus 34, 5656 AE Eindhoven, The Netherlands).

Actually these highest data transfer rates are only realized at the outermost part of the disc, as the disc in these cases spins with constant angular velocity (CAV recording). If one wants to realize e.g. true (True) 8× BD data transfer rate, that means 8× speed throughout the complete disc with constant linear velocity (CLV recording), the spinning speed has to be increased up to 16000 RPM.

Is known and reported various times that at spinning speeds above 10000 RPM an explosion like failure of a polycarbonate disc can occur, which can even destroy the drive. In general spinning speeds above 10000 RPM can be seen critical for all formats with discs made from standard optical disc grade Bisphenol A polycarbonate. By this there is a material related limitation on the maximum data transfer rate for optical discs. Therefore solutions were proposed to avoid the disc failure at high spinning speeds by modifications of the substrate material or disc architecture.

In EP 1 518 880 A1, special copolycarbonates were disclosed to produce Blu-ray Discs. These materials are difficult to produce and difficult to process to optical disc substrates. Bisphenol A polycarbonate (section 0079 of above patent) is judged to be not suitable also with respect to pit and groove transcriptability.

The same holds for JP 200-6318525-A, that discloses special polycarbonate blends with special blend partners. Pure Bisphenol A polycarbonate is judged to be not suitable. Suitable materials are disclosed to be those with higher bending modulus than Bisphenol A polycarbonate.

EP 1 130 587 A proposes sandwich discs comprising different polymers as core and shell materials. This disc architecture is complicated and special processing equipment is needed to produce those sandwich type discs.

KR 2003073242 describes optical discs with special fiber reinforcement in the inner part of the disc. These discs are said to able to sustain high spinning speed but are difficult to produce due to their complex non standard architecture.

PROBLEM TO BE SOLVED

There still exists the necessity for an optical disc substrate which allows cost effective disc production and can sustain high spinning speeds and exhibit a good transcriptability. The usage of standard optical disc grade Bisphenol A polycarbonates in general is limited to rather low rotation speeds such as below 13000 RPM. Problems were reported that at long term use such discs could fail due to disc breakage at about 13000 RPM which are used in current disc drive. It was therefore the task to develop a material that is able to solve the problem, that means which allows a long term use even at high rotation speed. Especially at rotation speeds of above 13000 RPM Blu-ray Disc made from standard optical disc grade Bisphenol A polycarbonate are endangered by disc breakage.

In a short term test discs made from standard optical disc grade Bisphenol A polycarbonate could not sustain a spinning speed of 24000 RPM for at least 30 minutes without failure due to disc breakage.

SUMMARY OF THE INVENTION

Surprisingly it was found that the usage of higher molecular weight Bisphenol A polycarbonate can solve the above described problem and at the same time can provide high pit and groove transcriptability. Especially suitable as a solution to the above described problem with respect to high speed Blu-ray Discs which needs spinning speeds above 10000 RPM are Bisphenol A polycarbonates with a relative solution viscosity (which corresponds to the molecular weight) in the range of 1.210 to 1.285, preferably of 1.220 to 1.285, more preferably in the range of 1.230 to 1.270. Additionally the amount of release agent in said polycarbonate should be lower than 2000 ppm, preferably lower than 1000 ppm, most preferred lower than 500 ppm based on 100 parts by weight of polycarbonate.

DETAILED DESCRIPTION OF THE DRAWINGS

FIGS. 1 and 2 illustrate the geometry of the casing and the test setup.

FIG. 3 illustrates the details of the claim and disc fixture according to the invention.

PREFERRED EMBODIMENT OF THE INVENTION

The polycarbonate resins are generally obtained by solution polymerization or melt polymerization of an aromatic dihydroxy compound and a carbonate precursor. Any aromatic dihydroxy compound is acceptable if discs made out of the respective polycarbonate satisfy the requirements of the high rotation speed test wherein said test is described in the experimental part of the specification and preferably the respective polycarbonate satisfies the above relative solution viscosity ranges Preferred aromatic dihydroxy compounds are compounds of formula (1)

in which Z denotes a radical of the formula (1a)

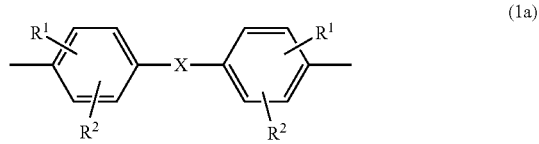

in which
$R^1$ and $R^2$ independently of each other represent H or $C_1$-$C_8$-alkyl, preferably H or $C_1$-$C_4$-alkyl, in particular hydrogen or methyl and
X represents a single bond, $C_1$-$C_6$-alkylene, $C_2$-$C_5$-alkylidene or $C_5$-$C_6$-cycloalkylidene, which may be substituted by $C_1$-$C_6$-alkyl, preferably methyl or ethyl, with the proviso that $R^1$ and $R^2$ represent hydrogen if X represents 3,3,5-trimethylcyclohexylidene.

Most preferably X represents isopropylidene and $R^1$ and $R^2$ represents hydrogen.

Aromatic dihydroxy compounds are generally known or can be prepared according to generally known methods. The interfacial or melt polymerization of polycarbonate is also generally known and described in numerous publications e.g. WO 2004/063249 A1, WO 2001/05866 A1, WO 2000/105867, U.S. Pat. No. 5,340,905, U.S. Pat. No. 5,097,002, U.S. Pat. No. 5,717,057.

The polycarbonate resin may be a homopolycarbonate obtained by homopolymerizing the above aromatic dihydroxy compound or a copolycarbonate obtained by copolymerizing two or more aromatic dihydroxy compounds mentioned above. The polycarbonate based on bisphenol A as diphenol monomer may contain up to 20 wt.-%, preferably up to 10 wt.-%, more preferably up to 5 wt.-%, based on the amount of diphenols used for the production of polycarbonate, additional diphenol monomers selected from the group consisting of 1,1-bis(4-hydroxyphenyl)-3,3,5-trimethylcyclohexan, α,α'-bis(4-hydroxyphenyl)m-diisopropylbenzen or 4,4'-dihydroxy-biphenyl or 2-Phenyl-3,3-bis(4'-hydroxyphenyl)phthalimide.

The reaction by the solution method is usually a reaction between the aromatic dihydroxy compound and phosgene, and is usually carried out in the presence of an acid coupling agent and an organic solvent. As the acid coupling agent, alkali metal hydroxides, such as sodium hydroxide or potassium hydroxide, or amine compounds, such as pyridine, are used. As the organic solvent, halogenated hydrocarbons, such as methylene chloride or chlorobenzene or mixtures of such hydrocarbons, are used. For accelerating the reaction, a catalyst such as tertiary amines, quaternary ammonium compounds or quaternary phosphonium compounds which are exemplified by triethylamine, N-ethyl-piperidine, tetra-n-butylammonium bromide, or tetra-n-butylphosphonium bromide respectively may also be used. Preferably, the reaction temperature is routinely 0 to 40° C., with a reaction time being 10 seconds to 5 hours and with a pH during the reaction being not less than 9. The reaction can be a batch process or a continuous process.

In the polymerization reaction, terminal capping agents for adjusting the relative solution viscosity are usually also employed. These terminal capping agents used may be monofunctional phenols. The polycarbonate resin obtained has its terminal capped by a monofunctional phenol based group so that it is superior in thermal stability to polycarbonate resin not obtained as described above. The monofunctional phenols are generally phenols or lower alkyl substituted phenols like phenol, p-tert-butylphenol, p-cumylphenol, isooctylphenol or long-chain alkyl phenols like decyl phenol, dodecyl phenol, hexadecyl phenol, octadecyl phenol, eicosyl phenol, docosyl phenol and triacontyl phenol. Preferred terminal capping agents are phenol, p-tert-butylphenol, p-cumylphenol and 3-n-pentadecylphenol (CAS #501-24-6).

The terminal capping agent is introduced in an amount to achieve the appropriate relative solution viscosity. The terminal capping agent may be used alone or in combination with other above mentioned phenol compounds.

The reaction by the melting method is usually an ester exchange reaction between an aromatic dihydroxy compound mentioned above and a carbonate ester, and is carried out by a method consisting in mixing the aromatic dihydroxy compound and the carbonate ester in the presence of an inert gas under heating and in distilling off the generated alcohol or phenol. Although the reaction temperature differs with e.g., the boiling point of the generated alcohol or phenol, it is usually 120 to 350° C. During the latter half of the reaction, the reaction system is reduced in pressure to approximately $1.33 \times 10^3$ to 13.3 Pa to facilitate distillation of the generated alcohol or phenol. The reaction time is usually 1 to 6 hours.

Among the carbonate esters, there are esters, such as C6 to C10 aryl groups or aralkyl groups or C1-4 alkyl groups, that may occasionally be substituted, specifically, diphenyl carbonate, bis(chlorophenyl)carbonate, dinaphtyl carbonate, bis (diphenyl)carbonate, dimethyl carbonate, diethyl carbonate and dibutyl carbonate. Of these, diphenyl carbonate is most preferred.

For accelerating the polymerization, polymerization catalysts may also be used. As these polymerization catalysts, those catalysts routinely used for esterification or ester exchange reactions, such as alkali metal compounds, e.g., sodium hydroxide, potassium hydroxide, or sodium or potassium salts of dihydric phenols, alkali earth metal compounds, such as calcium hydroxide, barium hydroxide or magnesium hydroxide, nitrogen-containing basic compounds, such as tetramethyl ammonium hydroxide, tetraethyl ammonium hydroxide, trimethylamine or triethyl-amine, alkoxides of alkali metals or alkali earth metals, phosphorous-containing basic compounds like tetraphenylphosphoniumphenolat or organic acid salts of alkali metals or alkali earth metals, zinc compounds, boron compounds, aluminum compounds, silicon compounds, germanium compounds, organotin compounds, lead compounds, osmium compounds, antimony compounds, manganese compounds, titanium compounds or zirconium compounds, may be used. These catalysts may be used alone or in combination. These catalysts are used in an amount preferably of $1 \times 10^{-8}$ to $1 \times 10^{-3}$ equivalent, more preferably $1 \times 10^{-7}$ to $5 \times 10^4$ equivalent, to one mol of the dihydric phenol as the starting material.

The aromatic polycarbonate resins may contain tri- or higher functional aromatic compounds or contain branched components in the polymer as a result of the isomerization reaction in polymerization. Examples of the tri- or higher functional aromatic compounds preferably include phlorogrucin, phlorogrucide, tris phenols, such as 4,6-dimethyl-2, 4,6-tris(4-hydroxyphenyl)heptene-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methyl phenol, and 4-(4-[1,1-bis(4-hydroxyphenyl)ethyl]benzene)-α,α-dimethylnbenzyl phenol, tetra(4-hydroxyphenyl)methane, bis(2,4-dihydroxyphenyl)ketone, 1,4-bis(4,4-dihydroxytriphenyl methyl)benzene, trimellitic acid, pyromellitic acid, benzophenone tetracarboxylic acid and acid chlorites thereof. In case tri- or higher functional aromatic compounds are used, 1,1,1-tris(4-hydroxyphenyl)ethane and 1,1,1-tris(3,5-dimethyl-4-hydroxyphenyl)ethane, are preferred.

The polycarbonate or the copolycarbonate are characterized by the relative solution viscosity, determined in a polymer solution in dichloromethane, measured with an Ubbelhode capillary viscosimeter, capillary type 0 C. The polymer concentration is 5 the measurement is done at a temperature of 25° C.

As release agent higher fatty acid ester of a monohydric alcohol or polyhydric alcohol may be added to the thermoplastic resin of the present invention. By blending a higher fatty acid ester of a monohydric or polyhydric alcohol, releasability from a mold at the time of molding the thermoplastic resin is improved, and a release load in the molding of a disk substrate becomes small, thereby making it possible to prevent the deformation of the disk substrate and pit dislocation caused by a release failure. The melt fluidity of the thermoplastic resin is also improved.

The positive amount of release agents is preferably less than 2000 ppm by weight of the resin, more preferably less than 1000 ppm by weight of the resin, especially preferred less than 500 ppm.

Preferred higher fatty acid esters are glycerol monostearate and glycerol monopalmitate as well as mixtures of them.

Phosphorus-based thermal stabilizers, may be added to the thermoplastic resin also. Suitable phosphorus-based thermal stabilizers are for example, phosphorous acid, phosphoric acid, phosphonous acid, phosphonic acid and esters thereof. Specifically, phosphite compounds, such as triphenyl phosphite, tris nonylphenyl phosphite, tris(2,4-di-tert-butylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis (4,6-di-tert-butylphenyl)octyl phosphite, bis(nonylphenyl) pentaerythritol diphosphite and bis(2,4-di-tert-butylphenyl) pentaerythritol diphosphite, and phosphate compounds, such as tributyl phosphate, trimethyl phosphate, tricresyl phosphate, triphenyl phosphate, trichlorophenyl phosphate, triethyl phosphate, diphenyl cresyl phosphate, diphenyl monoorthoxenyl phosphate, tributoxy ethyl phosphate, dibutyl phosphate and diisopropyl phosphate, may be indicated. Additional phosphorus-based thermal stabilizers are for example tetrakis(2,4-di-tert-butylphenyl)-4,4'-biphenylene diphosphonite, tetrakis(2,4-di-tert-butylphenyl)-3,3'-biphenylene diphosphonite and bis(2,4-di-tert-butylphenyl)-4-biphenylene phosphonite. Of these, tris nonylphenylphosphonite, distearyl pentaerythritol diphosphite, bis(2,4-di-tert-butylphenyl)pentaerythritol disphosphite, tris(2,4-di-tert-butylphenyl)phosphite, triphenyl phosphate, trimethyl phosphate, tetrakis(2,4-di-tert-butylphenyl)-4,4'-biphenylene diphosphonite and bis(2,4-di-tert-butylphenyl)-4-biphenylene phosphonite, are preferred. These thermal stabilizers may be used alone or as a mixture.

The amount of these thermal stabilizers, if added, is preferably 0.0001 to 0.05 weight part, more preferably 0.0005 to 0.02 weight part and most preferably 0.001 to 0.01 weight part to 100 parts by weight of the thermoplastic resin composition A generally known antioxidant may be added to the thermoplastic resin of the present invention to prevent oxidation. An example of the antioxidant is a phenol-based antioxidant. The amount of the antioxidant is preferably 0.0001 to 0.05 wt % based on the thermoplastic resin.

Above mentioned additives as well as other additives like optical stabilizers, colorants, antistatic agents and lubricants may be added to the resin for an optical disk substrate of the present invention in such limits that discs made out of the respective polycarbonate resin composition satisfy the requirements of the high rotation speed test.

Blends of polycarbonate with other thermopolastic resin may also be used as long as the discs made out of the respective blend satisfies the requirements of the high rotation speed test. Other thermoplastic resin may be selected from the group consisting of acrylic resin, preferably poly-methyl-methacrylate, polystyrene resins as homopolymer or as co- or blockpolymer with other monomers selected from the group comprising isoprene and butadiene or mixtures thereof, or polycycloolefinic resins preferably polymerization products of olefins, such as moieties with a norbornene structure.

In the preparation of the resin composition of the present invention, it is conceivable that mixing of polycarbonate resins and/or mixing of a polycarbonate resin and other resin is carried out in solution or in the melt. As for means of mixing, in the stage of a polymer solution, a vessel equipped with a stirrer is mainly used, and for the second case equipment like a tumbler, twin-cylinder mixer, Nauter mixer, Banbury mixer, kneading roll or extruder may be used. In either case, any technique may be used and not particularly limited.

DESCRIPTION OF THE PROCESS TO PRODUCE THE SUBSTRATE OF THE OPTICAL RECORDING MEDIUM

To produce a substrate from the above resin for an optical recording medium, an injection molding machine (including an injection compression molding machine) equipped with a stamper having pits and grooves which satisfy specifications required for an optical recording medium and a surface accuracy is used to form an optical disk substrate by injection molding. The thickness of the disk substrate generally is 0.3 to 2.0 mm, preferably 0.6 to 1.2 mm, most preferred 1.0 to 1.15 mm. This injection molding machine may be a generally used machine but preferably a machine made from a material whose cylinder and screws have low adhesion to resins, corrosion resistance and abrasion resistance in order to suppress the production of carbide and improve the reliability of a disk substrate. The environment of the molding step is preferably as clean as possible in view of the object of the present invention. It is also important that the material to be molded should be fully dried to remove water and that residence which might cause the decomposition of a molten resin should be avoided.

In the following a production of a standard substrate of the optical recording medium of the present invention is described, said method was used in the experimental part and is not limiting to the scope of the invention if the substrate satisfies the requirements of the solution viscosity. A disk substrate having a diameter of 120 mm and a thickness of 1.1 mm to 1.2 mm is injection molded from each pellet using an injection molding machine equipped with a mold and a stamper.

DESCRIPTION OF THE TESTING PROCEDURES

Measurement of the Relative Solution Viscosity

The polycarbonate or the copolycarbonates are characterized by the relative solution viscosity of a polymer solution in dichloromethane with an Ubbelhode capillary viscosimeter, capillary type 0C. The polymer concentration is 5 g/l, the measurement is done at a temperature of 25° C.

Measurement of the Transcriptability

The pit depth $d_R$ of the injection molded substrate with the replicated pit structure was measured with the Atomic Force Microscope in the tapping mode. The pit depth of the stamper $d_S$ was measured in the same way. The transcriptability t is then calculated via:

$$t = d_R/d_s * 100\%.$$

Measurement of the Radial Deviation

The radial deviation measures the angular deviation of the disc surface from a reference plane. It is defined as the angle measured in radial direction, between incident light perpendicular to the reference plane and the reflected light. The radial deviation of the disc was measured using an offline optical disk scanner from Basler (Modell: Basler Reference 100). The maximum nominal value measured on the disc is taken.

High Rotation Speed Test

The high speed test is setup by a motor (LMT Lehner Motoren Technik, Typ 1525/17), a power supply (CL-Electronics, Typ DF-1730SL20A), a printed circuit board (YGE Young Generation Electronics, Typ 65 HV) for motor RPM setting equipped with an output to measure the motor RPM and which can be actuated by a potentiometer to set the RPM and an oscilloscope (Hewlett Packard, Typ Infinium 500 MHz) to measure the motor RPM. On the motor axis a clamp for the disc is bolted down. The details of the clamp and the disc fixture can be seen from FIG. 3. The disc itself is mounted on the clamp with the fixture and put into a casing. The geometry of the casing and the test setup can be seen from FIGS. 1 to 2.

The disc is accelerated to 24000 RPM within 30 seconds. From that point of time the disc spins at 24000 RPM for 30 minutes at the longest. For the test always three discs made form the same polycarbonate are taken. The test is passed if within the 30 minutes none of the three disc is broken. The test fails if disc breakage occurs within this 30 minutes for at least one disc. In table 3 the time to failure is shown if applicable.

EXAMPLES

Description of the Substrate Materials

Comparative example 1: Dow Calibre® 1080 DVD is an optical disc grade bisphenol A poly-carbonate from DOW with a relative solution viscosity of 1.197.

Comparative example 2: Makrolon® OD2015 is a optical disc grade Bisphenol A polycarbonate from Bayer MaterialScience AG with a relative solution viscosity of 1.210.

Example 1: Is a bisphenol A polycarbonate with a relative solution viscosity of 1.227 and 400 ppm of glycerin mono stearate, prepared by interfacial polymerization and using p-tert-butylphenol as terminal capping agent Example 2: Is a bisphenol A polycarbonate with a relative solution viscosity of 1.261 and 400 ppm of glycerin mono stearate prepared by melt polymerization and using phenol as terminal capping agent.

Example 3: Is a bisphenol A polycarbonate with a relative solution viscosity of 1.281 and 290 ppm of glycerin mono stearate prepared by interfacial polymerization and using phenol as terminal capping agent.

Example 4: bisphenol A polycarbonate with a relative solution viscosity of 1.280 containing 3000 ppm pentaerythrit tetra stearate as release agent, prepared by interfacial polymerization and using phenol as terminal capping agent.

Comparative example 3: Is a bisphenol A polycarbonate with a relative solution viscosity of 1.300 containing 400 ppm of glycerin mono stearate, prepared by interfacial polymerization and phenol as terminal capping agent.

Disc Molding Process A

A disk substrate having a diameter of 120 mm and a thickness of 1.1 mm is injection molded from above materials using a Sumitomo SD 40E injection molding machine equipped with a mold AWM 5237 and a BD-ROM stamper. Following molding parameters were used, see table 1:

TABLE 1

Molding parameters according to disc molding process A used for the different examples

| No. | $T_{Cyl}$ (° C.) | $T_{Mold}$ (° C.) | Clamp Force (to) | Holding Pressure (kgf/cm$^2$) | Cooling Time (s) | Injection Speed (cm$^3$/s) |
|---|---|---|---|---|---|---|
| Comparitive example 2 | 380 | 84/86 | 40 | 540 | 5 | 48.7 |
| Example 1 | 380 | 84/86 | 40 | 540 | 5 | 48.7 |
| Example 2 | 380 | 84/86 | 40 | 540 | 5 | 48.7 |
| Example 4 | 380 | 84/86 | 40 | 540 | 5 | 48.7 |
| Comparitive example 3 | 380 | 84/86 | 40 | 540 | 5 | 48.7 |
| Example 3 | 385 | 83/85 | 30 | 750 | 3 | 48.7 |

$T_{cyl}$ is the melt temperature and $T_{Mold}$ is the mold temperature, whereas the left value represents the mirror side of the mold and the right value the stamper side of the mold.

Disc Molding Process B

A disk substrate having a diameter of 120 mm and a thickness of 1.15 mm is injection molded from above materials using a Netstal Diskjet 600 Hybrid injection molding machine using a screw with 32 mm diameter equipped with a mold AXX 1695 and a CD-Audio stamper. Following molding parameters were used, see table 2:

TABLE 2

Molding parameters according to disc molding process B used for the different examples

| No. | $T_{Cyl}$ (° C.) | $T_{Mold}$ (° C.) | Clamp Force (to) | Holding Pressure (bar) | Cooling Time (s) | Injection time (s) | Injection Speed (mm/s) |
|---|---|---|---|---|---|---|---|
| Comparative example 1 | 335 | 40/43 | 58 | 520 | 2 | 0.3 | 125 |

$T_{cyl}$ is the melt temperature and $T_{Mold}$ is the mold temperature, whereas the left value represents the mirror side of the mold and the right value the stamper side of the mold.

Results

Table 3 summarizes the characteristics of the molded substrates.

TABLE 3

| | Molded substrates (S) | | | | | |
|---|---|---|---|---|---|---|
| | Molding Process | Transcript-ability (%) | $T_{Mold}$ Stamper/Mirror (° C.) | Rad. Dev. (°) | Solution viscosity Pellets | High speed test 3 discs each |
| Example 1 | A | 93 | 84/86 | 0.42 | 1.227 | 3 times Pass |
| Example 2 | A | 92 | 84/86 | 0.48 | 1.261 | 3 times Pass |
| Example 4 | A | 92 | 84/86 | 0.50 | 1.280 | 3 times Pass |
| Example 3 | A | 94 | 83/85 | 0.22 | 1.281 | 3 times Pass |
| Comp. Example 2 | A | 95 | 84/86 | 0.38 | 1.201 | 3 times Fail (28 s, 35 s, 5 min) |
| Comp. Example 1 | B | Not applicable | 49/43 | Not applicable | 1.197 | 3 times Fail (3 s, 2 s, 30 s) |
| Comp. Example 3 | A | 85 | 84/86 | 0.79 | 1.300 | 3 times Pass |

As can be seen from the examples, disc substrates made from BPA-PC with relative solution viscosities in between 1.210 and 1.285 provide secure high speed operation, good pit transcriptability and flat discs. Comparative example 1 and 2 fail the high speed test as the relative viscosity is below 1.21 and by this do not fulfill our requirements. That means that in a short term test discs made from standard optical disc grade Bisphenol A polycarbonate could not sustain a spinning speed of 24000 RPM for at least 30 minutes without failure due to disc breakage. Comparative example 3 has excellent high speed test performance but due to the high relative solution viscosity the transcriptability is not above 85% and also radial deviation becomes higher than in all other cases in which polycarbonates with lower relative solution viscosities were used.

The invention claimed is:

1. A method of producing a substrate for optical discs which comprises utilizing polycarbonate that can sustain the high rotation speed test at 24000 RPM for at least 30 minutes without failure due to disc breakage and wherein the optical disc has a transcriptability of the pit/groove structure of >85% wherein the polycarbonate
   (i) has a relative solution viscosity of 1.210 to 1.285,
   (ii) contains a release agent in an amount less than 2000 ppm and
   (iii) contains biphenol A.

2. The method according to claim 1, wherein the polycarbonate has a relative solution viscosity of 1.220 to 1.285.

3. The method according to claim 1, wherein the polycarbonate has a relative solution viscosity of 1.230 to 1.270.

4. The method according to claim 1, wherein the polycarbonate contains less than 1000 ppm release agent.

5. The method according to claim 1, wherein the polycarbonate contains less than 500 ppm release agent.

6. The method according to claim 1, wherein the release agent is glycerin mono stearate or glycerin mono palmitate or mixtures thereof.

7. The method according to claim 1, wherein the transcriptability is more than 90%.

8. A substrate for an optical medium made of polycarbonate having a relative solution viscosity of 1.210 to 1.285 that can sustain 24000 RPM on a spin stand for at least 30 minutes without failure due to disc breakage and wherein the polycarbonate is based on bisphenol A and the polycarbonate contains a release agent in an amount less than 2000 ppm.

9. An optical medium made of the substrate according to claim 8.

* * * * *